United States Patent
Dajer et al.

(10) Patent No.: US 6,446,147 B1
(45) Date of Patent: Sep. 3, 2002

(54) WIRED-OR CONNECTION IN DIFFERENTIAL TRANSMISSION ENVIRONMENT

(75) Inventors: Miguel Dajer, Succasunna; Kenneth Yiu-Kwong Ho, Neshanic; Chang H. Kim, Whippany, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/311,159

(22) Filed: May 13, 1999

(51) Int. Cl.$^7$ .............................................. G06F 13/00
(52) U.S. Cl. ....................... 710/100; 710/106; 710/305; 710/309
(58) Field of Search ................................ 710/100, 105, 710/106, 305, 309, 240; 375/219, 220; 326/86, 87, 90, 91, 125, 128

(56) References Cited

U.S. PATENT DOCUMENTS

| | | | |
|---|---|---|---|
| 5,559,967 A | * | 9/1996 | Oprescu et al. ............. 710/105 |
| 5,778,204 A | * | 7/1998 | Brunt et al. ................. 710/128 |
| 6,101,567 A | * | 8/2000 | Kim et al. ................... 710/129 |
| 6,192,426 B1 | * | 2/2001 | Kando et al. ................ 710/52 |

OTHER PUBLICATIONS

TSB12LV01A Data Manual, IEEE 1394–1995, High–Speed Serial–Bus Link–Layer Controller, Jan. 1999.
TSB14C01A Data Manual, 5–V IEEE 1394–1995, Backplane Transceiver/Arbiter, Sep. 1997.

* cited by examiner

Primary Examiner—Peter Wong
Assistant Examiner—X. Chung-Trans
(74) Attorney, Agent, or Firm—Dickstein, Shapiro, Morin & Oshinsky LLP

(57) ABSTRACT

A method and circuit for performing a wired-or function in a differential transmission environment are disclosed. The wired-or function is realized by enabling the differential driver portion of the differential transceiver when the signaling path is to be driven with a logical true signal and disabling the differential driver portion when a logical false signal is to be transmitted to the signaling path. In a preferred embodiment, a 1394 backplane node (a node is a single connection to the bus which may or may not be shared by multiple devices) is implemented using commercially available chips including a physical arbiter, a link controller, a differential transceiver, a programmable logic device, and some additional transistors.

20 Claims, 6 Drawing Sheets

WIRED-OR CONNECTION IN DIFFERENTIAL TRANSMISSION ENVIRONMENT

BACKGROUND OF THE INVENTION

1. FIELD OF THE INVENTION

The present invention relates generally to the field of communication, and more particularly to a computer bus having a wired-or function and operating in a differential transmission environment.

2. DESCRIPTION OF THE RELATED ART

Several new standards for high speed buses have been promulgated recently. Among these is the IEEE 1394-1995 High Speed Serial Bus standard, which shall be referred to herein as the 1394 standard. Similarly, a bus conforming to the 1394 standard will be referred to as a 1394 bus. Furthermore, as used herein, the term bus refers to any electrical signaling path between two or more devices.

The 1394 standard, often referred to by a commercial implementation of the standard known as FIREWIRE™, defines a high speed serial bus with two different types of physical connection: backplane or cable. Cable connections are used for daisy chain configurations and are not of concern herein. The backplane configuration is useful in devices such as personal computers and other high-speed applications. The 1394 bus supports data transfer rates as high as 100 megabits per second.

The 1394 standard does not define the backplane environment (i.e., the interface technologies), but does require that a wired-or function be performed in whatever backplane environment is chosen. In this context, wired-or means that when several devices are connected to a common point (such as a bus conductor), the common point will be read as a logical "true" by all devices when any one or more devices asserts a logical "true" signal, and will be read as a logical "false" when no device asserts a logical "true" signal. It should be noted that a logical true signal does not necessarily mean a higher voltage - many buses are implemented using active low, or reverse, conventions where a logical true signal is represented by a low voltage level (e.g., 0 volts) and a false is represented by a high voltage level (e.g. 5 volts). Thus, for example, a conventional AND gate performs an OR function if the inputs to the gate are defined as active low.

Given this wired-or requirement, the obvious choices for a 1394 backplane environment are single-ended transmission technologies with open collectors or open drains such as GTL (gunning transceiver logic) or BTL (backplane transceiver logic). However, single-ended open collector/drain technologies such as GTL/BTL cannot offer the noise immunity that differential transmission technology can. Unfortunately, differential transmission technology could not be used in a 1394 backplane because known differential transceivers do not perform the wired-or function required by the 1394 standard.

What is needed is a differential transmission circuit capable of performing a wired-or function.

SUMMARY OF THE INVENTION

The present invention overcomes the aforementioned limitations of the prior art by providing a method for, and a circuit capable of, performing a wired-or function in a differential transmission environment. The wired-or function is realized by enabling the differential driver portion of the differential transceiver when the signaling path is to be driven with a logical true signal and disabling the differential driver portion when a logical false signal is placed on the signaling path. In a preferred embodiment, a 1394 backplane bus node (a node is a single connection to the bus which may or may not be shared by multiple devices) is implemented using commercially available chips including a physical arbiter, a link controller, a differential transceiver, a programmable logic device, and some additional transistors.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

The present invention will be illustrated through a description of an apparatus and method for performing a wired-or function in a differential transmission bus environment. Numerous specific details, such as the bus standard, the implementation of the bus interface, the specific hardware components illustrated in the preferred embodiment, etc., are set forth in order to provide a thorough understanding of the present invention. It will be obvious, however, to one skilled in the art that the present invention may take many different forms and that the present invention may be practiced without the specific details set forth herein. Accordingly, the drawings and description herein are to be regarded as illustrative in nature and not as restrictive.

Figure 1:
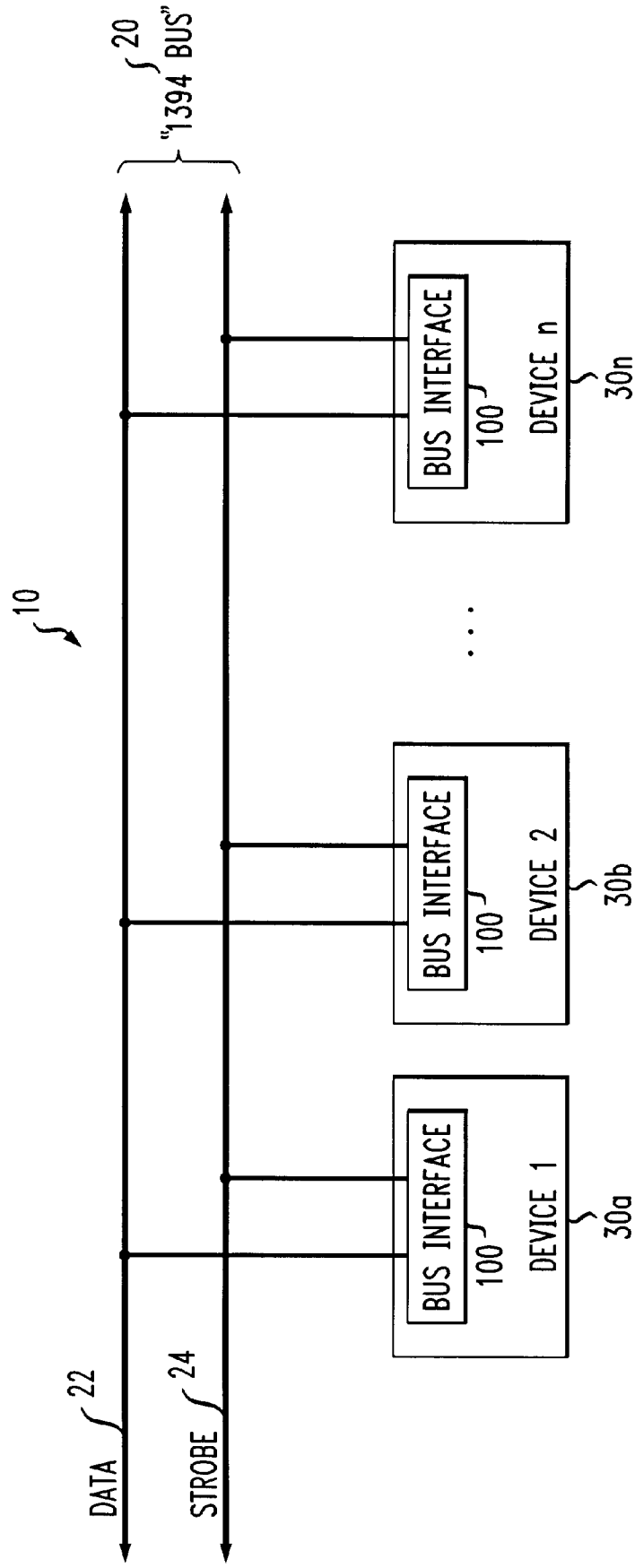
FIG. 1 is a hardware block diagram of a number of devices connected to a single-ended transmission 1394 bus according to a prior art configuration.

FIG. 1 shows a system 10 comprising a number of devices 30a–n connected by a 1394 bus 20. The system 10 could be any system connected by a bus, such as a computer. In such a case, the devices could include such devices as a processor, a video card, a modem, a memory, an I/O device such as a network interface card, or any other device for which high speed communication is desirable. The 1394 bus consists of only two separate conductors, a "DATA" and a "STROBE" conductor. Each of the devices 30a–n includes a bus interface 100. The bus interface 100 is the actual, physical connection to the bus 20. The bus interface 100 performs the low-level tasks associated with reading data from the bus 20 and writing data to the bus 20.

Figure 2:
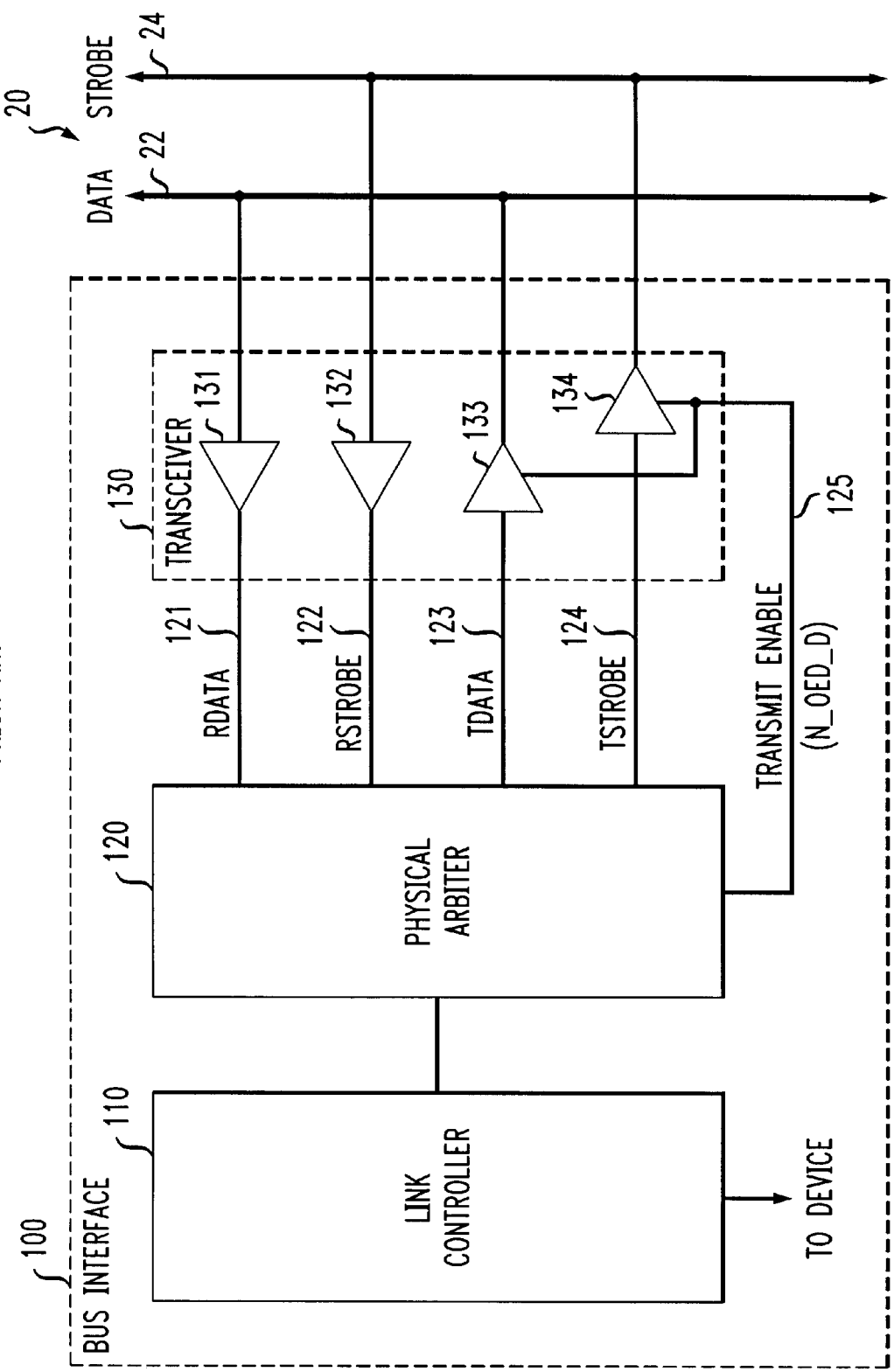
FIG. 2 is a hardware block diagram of a prior art bus interface for one of the devices of FIG. 1.

A block diagram of a prior art bus interface is illustrated in FIG. 2. The bus interface comprises a link controller 110 connected to a physical arbiter 120, which in turn is connected to a transceiver 130 which itself is connected to the 1394 bus 20. The popularity of the 1394 standard has resulted in a number of manufacturers implementing commercially available integrated circuits for implementing a 1394 bus node. For the purposes of example only, Texas Instruments manufactures a link controller circuit, part number TSB12LV01A, and a physical arbiter circuit, part number TSB14C01A, for implementing a 1394 node. These circuits are designed to work together to transfer data to and from the device in which these circuits are incorporated to a 1394 bus. The functions performed by these circuits are approximately equal to the respective functions performed by the link layer and the physical layer as defined by the ISO (International Standards Organization) OSI (Open Systems Interconnection) reference model. These functions are well known to those of skill in the art. For fill details of the functions performed by these circuits see the IEEE 1394-1995 standard, the TSB12LV01A SLLS332 data manual dated January, 1999(link controller), and the TSB14C01A SLLS284 data manual dated September, 1997 (physical arbiter). The contents of all three of these publications are hereby incorporated by reference herein. It will be obvious to those of ordinary skill in the art that any number of circuits may be used to perform the functions of the physical arbiter 120 and link controller 110 and that the invention is not limited to use with the specific link controller 110 and physical arbiter discussed herein or even to use of a link controller and/or physical arbiter per se. For the purposes of the present invention, it is sufficient to note that the physical arbiter 120 and link controller 110 together form a data circuit 115 for supplying data to be transmitted over the bus.

The physical arbiter 120 is not designed to be connected directly to the bus 20. Rather, a single-ended open collector transceiver 130 such as part no. FB2041A, also available from Texas Instruments, must be used. The transceiver 130 includes four drivers: an input driver 131 with an input connected to the data line 22 of the bus 20 and an output connected to the RDATA (receive data) line 121 of the physical arbiter 120; an input driver 132 with an input connected to the strobe line 24 of the bus 20 and an output connected to the RSTROBE (receive strobe) line 122 of the physical arbiter 120; an output driver 133 with an input connected to the TDATA (transmit data) line 123 of the physical arbiter 120 and an output connected to the data line 22 of the bus 20; and an output driver 134 with an input connected to the TSTROBE (transmit strobe) line 124 of the physical arbiter 120 and an output connected to the strobe line 24 of the bus 20. A Transmit Enable (N_OED_D) signal is supplied by the physical arbiter on line 125 to both output drivers 133, 134. The input drivers 131, 132 are always enabled.

Under normal conditions (conditions other than arbitration and bus reset) on the bus, only a single device will be driving the data and strobe lines 22, 24, so no wired-or function is necessary. However, when an arbitration period begins or when a bus reset occurs, the wired-or function is required. A brief description of bus activity under both arbitration and bus reset conditions will be explained in order to provide an understanding of the requirements for the wired-or function. Further details concerning bus activity during these and other conditions are set forth in the 1394 standard document and data sheets for the physical arbiter 120 and link controller 110 mentioned above.

When both the data and strobe lines 22, 24 are not asserted for a period of time defined in the 1394 standard (i.e., when no device, or node, on the bus has sent data for a period of time), the devices on the 1394 bus 20 may begin to arbitrate for control of the bus. According to the 1394 standard, when a device begins to arbitrate, it sends a 4 bit priority code and a 6 bit physical device identifier onto the data line 22 of the bus one bit at a time while asserting (i.e., transmitting a logical true signal to) the strobe line 24 during the entire arbitration period. While each device is sending each bit of its priority and physical identification (hereinafter "ID"), the device also monitors the data line 22 of the bus. As long as the content of the data line 22 matches the data the device is sending during arbitration, the device continues to send subsequent priority/ID bits. As soon as the content of the data line 22 is different from the data the device is sending, the device recognizes that it has "lost" the arbitration and ceases to send data to either the data or strobe lines 22, 24 until the device enters another arbitration period, which will occur a set amount of time after the device that wins the arbitration finishes sending its data.

Each device on the bus is assigned a unique physical ID, which is a 6 bit binary number. Details as to how and why the physical IDs are assigned are beyond the scope of this invention. The 1394 standard defines different priorities, such as urgent and fair. Reference should be made to the 1394 standard for a definition of these priority levels. It is sufficient for the purpose of this invention to note that a device may send data at different priorities. Under normal conditions on the bus, a device sending data toggles the strobe line 24, or the strobe line 24 is unasserted; thus, other devices can recognize that arbitration is in progress by observing that the strobe line 24 is asserted for a predetermined period of time and that, as discussed below, the data line is not also constantly asserted throughout the same period.

Figure 3:
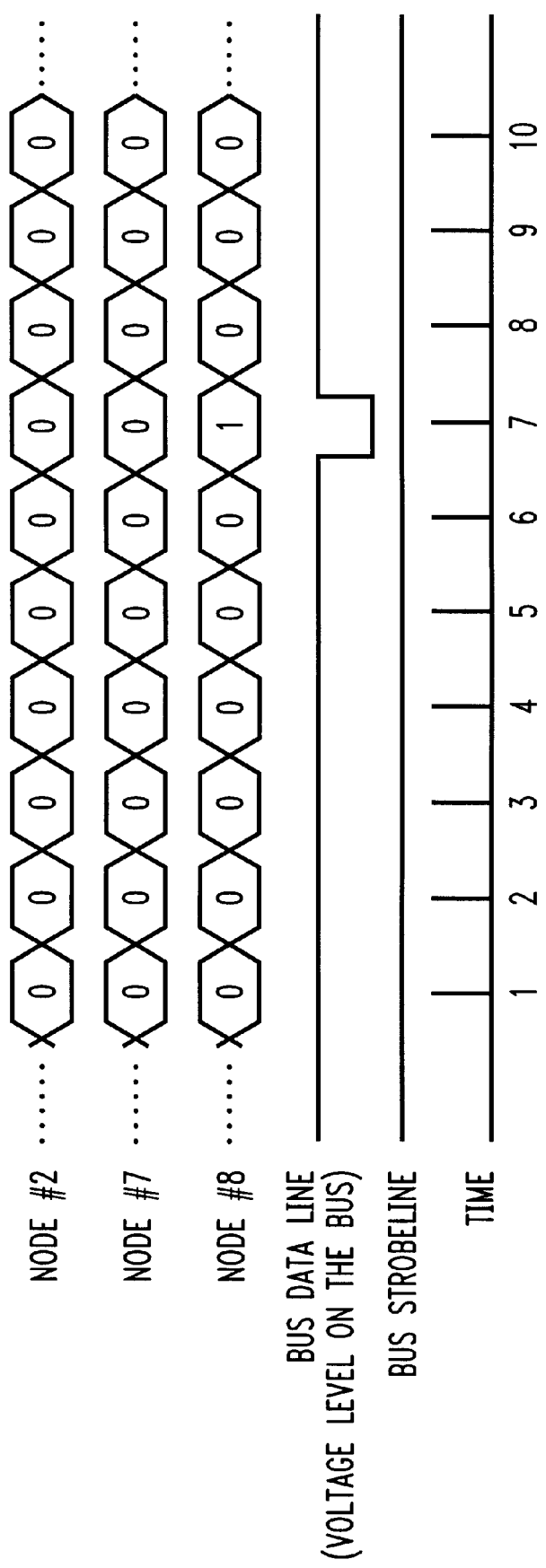
FIG. 3 is a timing diagram of an arbitration sequence on a 1394 bus.

An example of an arbitration period is shown in FIG. 3. In FIG. 3, 3 devices (which are also referred to as nodes in FIG. 3 and in various places in this specification) such as the devices 30$a$, $b$, $n$ shown in FIG. 1, are arbitrating for the bus 20. Each of the devices has a unique physical ID as discussed above. In the example shown in FIG. 3, the device 30$a$ has a physical ID of 2 ($2_{10}$=$000010_2$), the device 30$b$ has a physical ID of 7 ($7_{10}$=$000111_2$), and the device 30$n$ has a physical ID of 8 ($8_{10}$=$001000_2$). In the example of FIG. 3, the bus 20 is implemented in reverse logic; that is, a logical true condition corresponds to low or zero voltage, and a logical false condition corresponds to high voltage. The outputs of the physical arbiter 120 are not reverse logic; therefore, the transceiver 130 must perform the requisite inversion.

All three devices 30$a$–$n$ begin arbitrating for the bus at the same time, corresponding to time 1 in FIG. 3. In this example, all three devices 30$a$–$n$ are using a priority of zero. Thus, the physical arbiter of each device 30$a$–$n$ outputs the first bit (in most significant bit order) of the priority on the TDATA line 123 through the transceiver data output driver 133 and onto the data line 22 at time 1, the second bit at time 2, etc.

As each device outputs each bit of the priority, each device also monitors the data line 22 through the input data driver 131 and the RDATA line 121 of the physical arbiter 120. If a device reads a bit on the data line 22 that is different from the bit it was transmitting, the device has lost the arbitration and stops any further arbitration at that point. Thus, if any device had had a priority higher than zero, then that device would have asserted a logical true condition (low voltage on the bus, high voltage as seen by the physical arbiter). Because of the wired-or operation of the open-collector transceiver 130, each other device would have sent a 0 and read a 1 for that bit; thus, each other device would have been alerted that it had lost the arbitration and would not have asserted any further logical true signals onto the bus 20.

In the example of FIG. 3, no device had a priority higher than zero; therefore, no device read a data bit different from what it sent to the bus 20. Accordingly, each device begins to send its physical ID onto the bus at time 5. At times 5 and 6, all devices send a logical false signal to the bus; thus all devices read a logical false signal and continue the arbitration process. However, at time 7, the device with a physical ID=8 sends a logical true signal to the bus while the other two devices continue to send logical false signals. Because of the wired-or operation, all three devices will read a logical true condition on the bus. The device with a physical ID=8 will recognize that the value it read from the bus is equal to the value it sent to the bus and hence will continue the arbitration process. The other two devices will recognize that the value they read from the bus is different from the value they sent to the bus and hence will stop arbitrating for the bus. This is why the other two devices do not output their physical IDs at times 8–10 of FIG. 3. The device with a physical ID=8 will continue sending the remaining bits of its physical ID (the three remaining bits are all zeros in this example) at times 8–10 and will recognize that the data matches in all cases. Because each physical ID is unique, that device with physical ID=8 recognizes that it has won the arbitration and thus has control of the bus. Normal conditions on the bus, with the winner of the arbitration sending data, are then resumed until a predetermined time period after the winner has completed sending its data and arbitration begins again.

The arbitration sequence described above is one of the two situations in which the wired-or function is required for a 1394 bus implementation. The other condition is a bus reset condition. Any one device may issue a bus reset at any time. A bus reset condition occurs when both the data line and the strobe line are held at a logical true condition for a specified period of time. Thus, any device must be capable of asserting both lines regardless of what the other devices are trying to assert. The wired-or operation accomplishes this: the data and strobe lines will be at a logical true condition if any one device puts logical true signals on the bus - thus any device may reset the bus.

One problem associated with using an open-collector transceiver 130 as described above is low noise immunity. The low noise immunity may be tolerable for some situations, but it is not tolerable for all situations. Where high noise immunity is desired, differential transmission is frequently used. In a differential transmission environment, a single conductor is replaced by two conductors (one designated positive and the other designated negative) and logical signals are represented by the voltage differential between the conductors. For example, a positive voltage measured across the positive and negative conductors may represent a logical true value, while a negative voltage may represent a logical false value.

As is well known in the art, differential transmission offers much higher noise immunity than open collector/drain technologies. Furthermore, differential transceivers are widely available and are inexpensive. However, differential transceivers do not perform the wired-or function. That is, if some differential transceivers on a bus are attempting to assert a logical true signal while others are attempting to assert a logical false signal, the devices on the bus may or may not read a logical true signal on the bus. Thus, differential transceivers cannot be used in the same manner that open collector transceivers are used in a 1394 backplane.

The present invention solves this problem by controlling the differential transceivers to drive the bus in a normal fashion when wired-or operation is not required, and, when wired-or operations are required, to alternate between driving the bus when a logical true signal is desired and not driving the bus when a logical false signal is desired. Each node on the bus also ensures that a logical false signal will be read when no node is driving the bus. Thus, each node will only drive the bus for a logical true signal, so even if two or more nodes are driving the bus, no conflict will occur because all nodes attempting to drive the bus will "agree" on the desired signal. Conversely, when multiple nodes desire to send a logical false signal, no node will drive the bus and all nodes will read a logical false signal from the bus.

Figure 4:
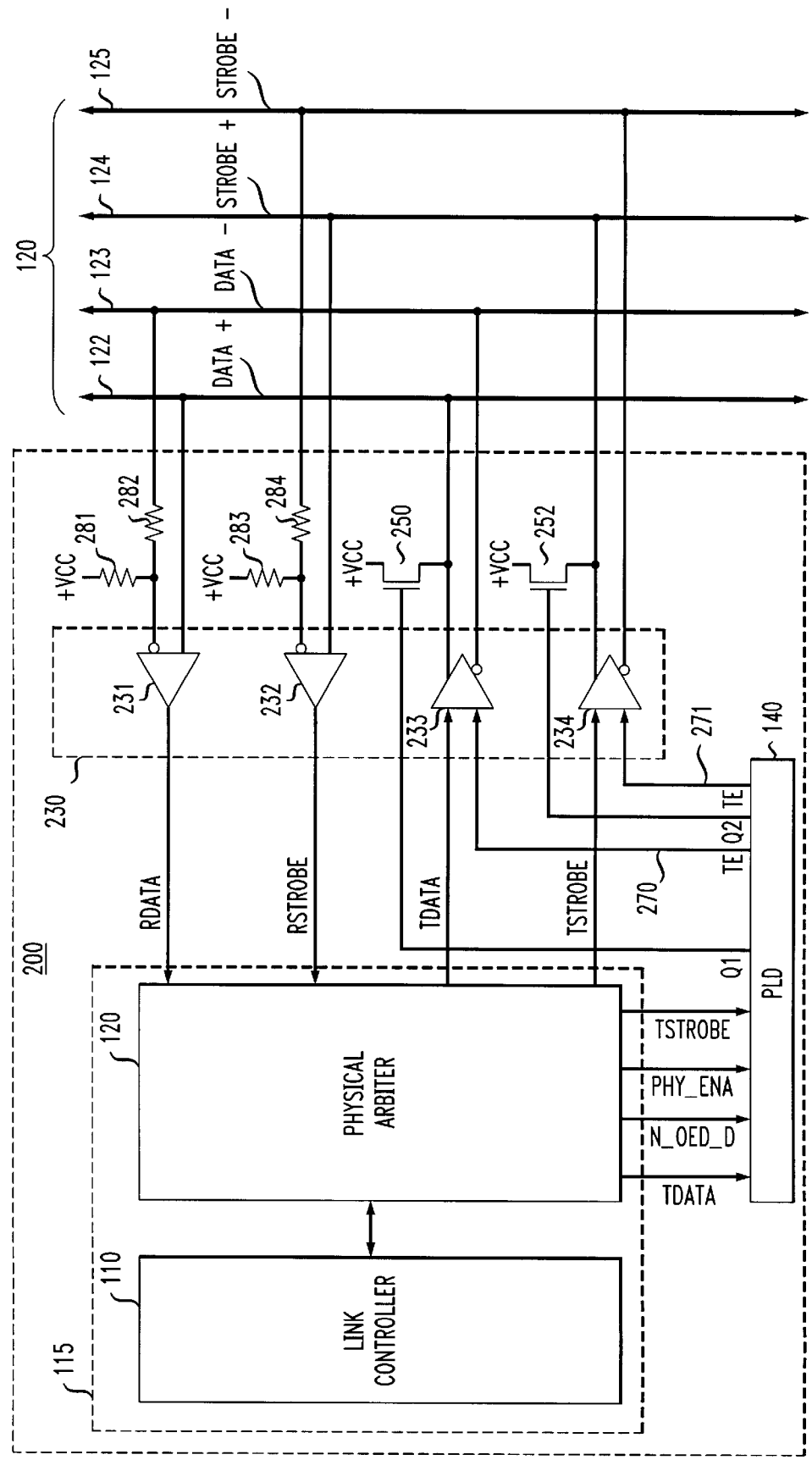
FIG. 4 is a circuit diagram of a bus interface unit for use in a differential transmission environment according to the present invention.

FIG. 4 illustrates a circuit 200 for implementing this scheme. In FIG. 4, the same link controller 110 and physical arbiter 120 from FIG. 2 are connected to each other. A differential transceiver 230 (with two input drivers 231, 232 connected to the DATA bus signal and two output drivers 233, 234 connected to the STROBE bus signal) is used in place of the single ended transceiver 130 of FIG. 2. The bus 120 of FIG. 4 includes two conductors 122, 123 for the data signal and two conductors 124, 125 for the strobe signal because the bus 120 is differential. The major difference between the circuit 200 of FIG. 4 and the circuit 100 of FIG. 2 is that the N_OED_D (transmit enable) signal for the differential output drivers is controlled by a PLD (programmable logic device) 140 rather than by the TRANSMIT ENABLE signal generated by the physical arbiter 120.

Operation of the circuit of FIG. 4 will now be explained in detail. The PLD 140 determines whether the bus 120 is in a normal state or an abnormal state (arbitration or bus reset period). When the bus 120 is in a normal state, only one device will be driving the bus (attempting to assert logic true and false signals). In a normal state, the Transmit Enable (N_OED_D) signal from the physical arbiter 120 is passed along by the PLD 140 as the two transmit enable signals 270, 271 to the differential transceivers 230 when the device has control of the bus. Because only one transceiver 230 is driving the bus under normal conditions, a wired-or operation is not required.

Figure 5:
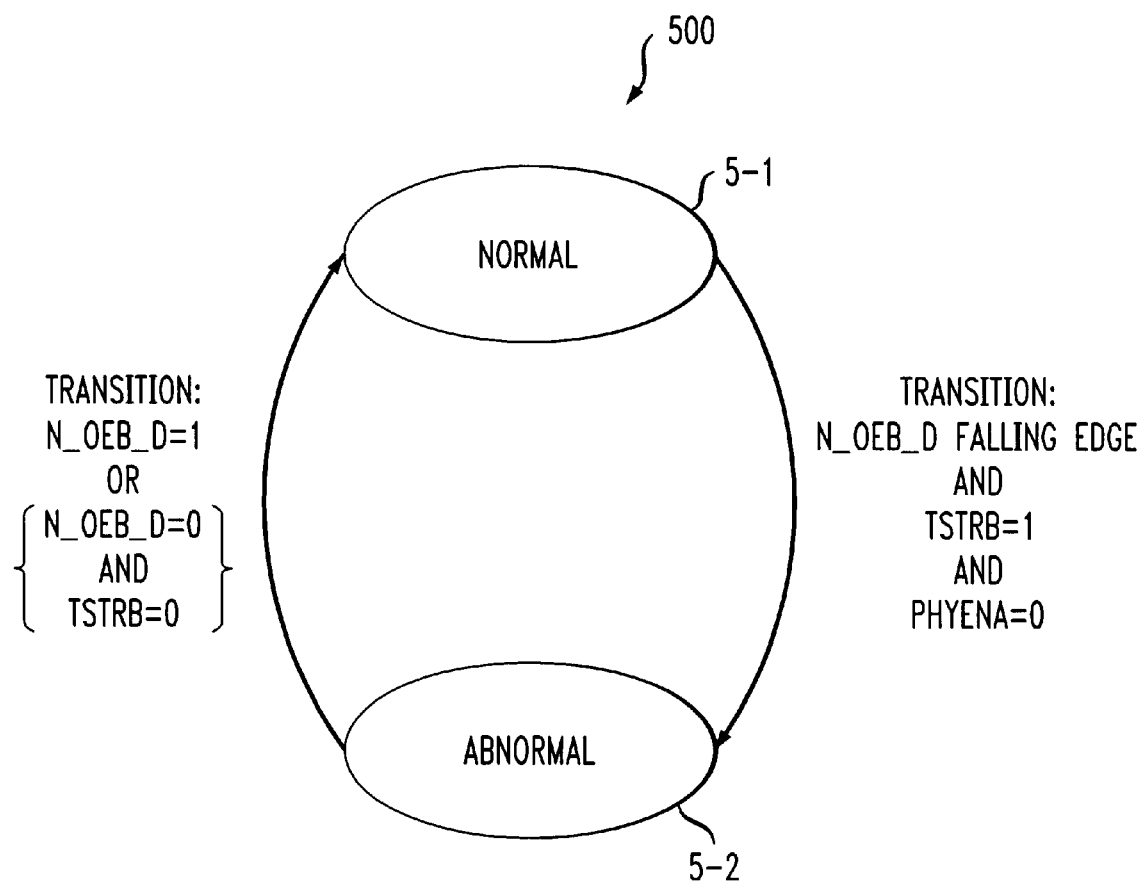
FIG. 5 is a state diagram for a portion of the circuit of FIG. 4.

The PLD 140 monitors the N_OED_B (transmit enable), the TSTRB (transmit strobe) and the PHY_ENA (a signal used for testing purposes on the specific TI physical arbiter used in our example) signals to determine when a bus reset or arbitration period occurs. The PLD implements a simple state machine 500, as shown in FIG. 5, to make this determination. The state machine 500 is initialized to the NORMAL state 5-1. The state machine 500 remains in this state until the following transition event is detected: a falling edge on the N_OEB_D signal from the physical arbiter 120 is detected AND the TSTRB signal is a "1" AND the PHY_ENA signal is a "0". When this transition event is detected, the state machine 500 enters the ABNORMAL state. The state machine 500 remains in this state until the following transition event is detected: N_OED_B is a "1" OR [N_OED_B is a "0" AND TSTRB is a "0"]. When this transition event is detected, the state machine 500 returns to the NORMAL state.

The state machine is used to control the differential driver transmit enable signals 270, 271 as follows: as discussed above, when the state machine 500 is in the NORMAL state 5-1, the transmit enable signals 270, 271 are simply set equal to the N_OED_B signal from the physical arbiter 120. When the state machine 500 is in the ABNORMAL state 5-2, the transmit enable signal 271 connected to the differential driver 234 for the strobe lines 124, 125 is set to a logical true value. This is because the strobe signal is asserted by the node whenever the node is in either an arbitration or bus reset condition. The transmit enable signal 270 connected to the differential driver 233 for the data lines 122, 123 is set to enable the data driver 233 when the TDATA signal from the physical arbiter 120 is a logical true value and to disable the data driver 233 when the TDATA signal is a logical false value (which may be accomplished through a simple OR operation, as will be recognized by those of skill in the art). Resistors 281, 282, 283, and 284 are connected to the negative inputs of the input differential drivers 231, 232, in a manner well known in the art, to ensure that when no node is asserting a logical true signal on the bus, all nodes will "read" a logical false signal.

The above scheme implements the wired-or operation when multiple nodes are arbitrating, or when a bus reset condition is declared by a node with control of the bus. However, there is still the possibility that an indeterminate result will occur when one node with control of the bus is driving a logical false signal and a second node attempts to declare a bus reset by setting the strobe and data signals high on the bus.

In a condition when one node wishes to declare a bus reset condition while another node has control of the bus, it is necessary for the node declaring the bus reset to do more than simply attempt to send logical true signals to the bus using the differential drivers 233, 234 because, as discussed above, an indeterminate result will occur when two differential drivers attempt to assert conflicting signals on the bus. This problem is overcome by providing two transistors 250, 252 to connect the positive data line 122 and positive strobe line 124 on the bus to Vcc when a logical true signal is to be written to the bus. The gates of the transistors 122, 124 are controlled by the PLD 140, which turns the gates "on" in the same manner and under the same conditions that the transmit enable signals 270, 271 are turned on in the ABNORMAL state 5-2, which includes asserting both signals under a bus reset condition. Because turning on the gates of the transistors 250, 252 essentially connects the positive signals of the bus 120 to Vcc, all nodes on the bus will read a logical true signal even when another node is attempting to assert a logical false signal. Thus, with the transistors 250, 252, wired-or operation of the bus 120 is ensured under all conditions in which it is required.

Figure 6:
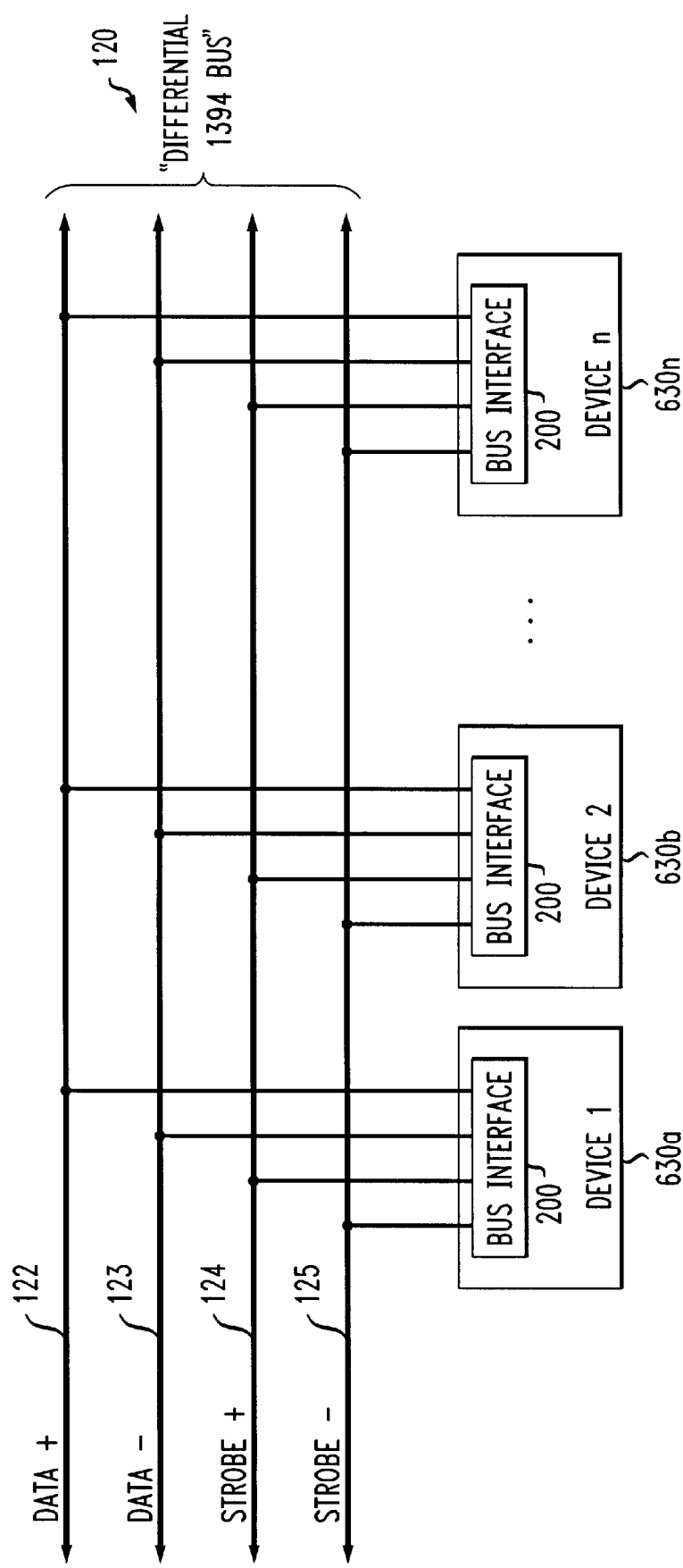
FIG. 6 is a hardware block diagram of a number of devices connected to a differential transmission 1394 bus according to the present invention.

FIG. 6 is a schematic diagram of a system 600 comprising several devices 630a–n connected to a differential 1394 bus 120. Such a system may be a computer system such as a personal computer or workstation, or may be one of any number of other systems in which a bus is utilized. Each of the devices 630a–n includes a bus interface 200 as described above.

A method and circuit for implementing an interface to a differential signaling path, such as a 1394 bus, requiring a wired-or operation, has been described. The interface is preferably implemented using readily available commercial integrated circuits. The interface drives the signaling path normally under conditions when wired-or operation is not required, and only drives the bus for a logical true condition when wired-or operation is required. Furthermore, additional transistors are used in addition to differential drivers when the bus is driven for a logical true value when wired-or operation is required to ensure that other nodes on the bus not operating in wired-or configurations do not cause an ambiguous condition on the bus.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A differential signaling path interface comprising:
   a data circuit for providing signals to be transmitted over a signaling path;
   a differential transceiver, including differential output drivers and differential input drivers, connected to the data circuit and to a differential signaling path; and
   a logic circuit to a physical arbiter and the differential transceiver, the logic circuit being configured to enable the differential output drivers when one state of a logical signal is to be transmitted to the differential signaling path and to disable the differential output drivers when the other state of said logical signal is to be transmitted to the differential signaling path.

2. The interface of claim 1, wherein the data circuit comprise a link controller connected to the physical arbiter, the physical arbiter being coupled to the differential transceiver.

3. The interface of claim 1, wherein the signaling path comprises:
   a bus having a differential strobe line and a differential data signal line; and the interface further includes a first transistor having a first control terminal connected to the logic circuit, said first transistor having a second switching terminal connected to the differential strobe signal and a third switching terminal connectable to a voltage source, said interface including a second transistor having a fourth control terminal connected to the logic circuit, said second transistor having a fifth switching terminal connected to the differential data signal line and a sixth switching terminal connectable to a voltage source, the logic circuit being configured to sense the need for a wired-or operation and connect the voltage source to the differential strobe signal line and the differential data signal line, respectively, when a wired-or operation is required.

4. The interface of claim 3, wherein the signaling path comprises a differential IEEE 1394 bus.

5. The interface of claim 4, wherein the logic circuit senses the need for a wired-or operation by sensing bus reset and arbitration conditions.

6. The interface of claim 5, wherein the logic circuit monitors signals from the physical arbiter including a transmit enable signal for enabling the differential output drivers and the strobe signal to determine bus reset and arbitration conditions.

7. The interface of claim 5, wherein the logic circuit comprises a programmed logic device.

8. The interface of claim 1, further comprising at least one resistor connected to the differential signaling path and connectable to a voltage source such that a logical false signal is read on the differential signaling path when no differential driver on the signaling path is enabled.

9. A data system comprising:
   at least two devices connected by a differential signaling path, each of the devices including a differential signaling path interface having:
      a data circuit for providing signals to be transmitted over the signaling path;

a differential transceiver, including differential output drivers and differential input drivers, connected to the data circuit and to the differential signaling path; and a logic circuit connected to a physical arbiter and the differential transceiver, the logic circuit being configured to enable the differential output drivers when one state of a logical signal is to be transmitted to the differential signaling path and to disable the differential output drivers when the other state of said logical signal is to be transmitted to the differential signaling path.

10. The system of claim 9, wherein the data circuit comprises a link controller connected to a physical arbiter, the physical arbiter being connected to the differential transceiver.

11. The system of claim 9, wherein the signaling path comprises:

a bus having differential strobe and data signal lines, and wherein the interface further includes:

a first transistor having a first control terminal connected to the logic circuit, said first transistor having a second switching terminal connected to the differential strobe signal, and a third switching terminal connectable to a voltage source; and a second transistor having a fourth control terminal connected to the logic circuit, said second transistor having a fifth switching terminal connected to a differential data signal line and a sixth switching terminal connectable to a voltage source, the logic circuit being configured to sense the need for a wired-or operation and to connect the voltage source to the differential strobe signal line and to the differential data signal line, respectively, when a wired-or operation is required.

12. The system of claim 11, wherein the signaling path comprises a differential IEEE 1394 bus.

13. The system of claim 12, wherein the logic circuit senses the need for a wired-or operation by sensing bus reset and arbitration conditions.

14. The system of claim 13, wherein the logic circuit monitors signals from the physical arbiter including a transmit enable signal for enabling the differential output drivers and the strobe signal to determine bus reset and arbitration conditions.

15. The system of claim 9, wherein the logic circuit comprises a programmed logic device.

16. A method for performing a wired-or operation on a differential signaling path comprising the steps of:

detecting when a wired-or operation is required;

enabling a differential output driver when one state of a logical signal is to be transmitted to the differential signaling path and a wired-or operation is required; and disabling the differential output driver when the other state of said logical signal is to be transmitted to the differential signaling path and a wired-or operation is required, whereby a wired-or operation is performed on said differential signaling path.

17. The method of claim 16, further comprising the step of sensing when a wired-or operation is required.

18. The method of claim 16, further comprising the step of:

connecting a positive voltage to the differential signaling path such that a logical false signal is read on the differential signaling path when no differential driver on the signaling path is enabled.

19. The method of claim 16, wherein the differential signaling path is a differential bus operating in accordance with the 1394 standard.

20. The method of claim 16, further comprising the step of connecting a voltage source to the signaling path through a transistor when a wired-or operation is desired and a logical true signal is to be transmitted to the bus.

* * * * *